United States Patent [19]

Matsunawa

[11] Patent Number: 4,556,916
[45] Date of Patent: Dec. 3, 1985

[54] PICTURE IMAGE DISCRIMINATING APPARATUS

[75] Inventor: Masahiko Matsunawa, Hachioji, Japan

[73] Assignee: Konishiroku Photo Industry Co., Ltd., Tokyo, Japan

[21] Appl. No.: 452,027

[22] Filed: Dec. 21, 1982

[30] Foreign Application Priority Data

Dec. 26, 1981 [JP] Japan ................................ 56-213902
Dec. 28, 1981 [JP] Japan ................................ 56-213826

[51] Int. Cl.$^4$ .............................................. H04N 1/40
[52] U.S. Cl. .................................... 358/282; 358/280; 358/283; 382/50
[58] Field of Search ...................... 358/282, 283, 280; 382/9, 50, 51

[56] References Cited

U.S. PATENT DOCUMENTS 4,208,677 6/1980 Schayer et al. ..................... 358/280
4,414,581 11/1983 Kato et al. .......................... 358/280

Primary Examiner—Howard W. Britton
Assistant Examiner—John K. Peng
Attorney, Agent, or Firm—James E. Nilles; Thomas F. Kirby

[57] ABSTRACT

A picture image discriminating apparatus which operates for scanning a document and transmitting a picture signal obtained through converting a light signal photoelectrically at every unit reading size of 0.01 mm$^2$ or over to a signal processing division for picture image discrimination by a peak interval of a time series output of the picture signal. The picture image discriminating apparatus has a differentiating circuit to differentiate a time series output of the picture signal obtainable according to the light signal, a binary-coding circuit to compare an output signal from the differentiating circuit with a specific level and output a binary pulse signal, and a counter to count an output pulse from the binary-coding circuit.

6 Claims, 14 Drawing Figures

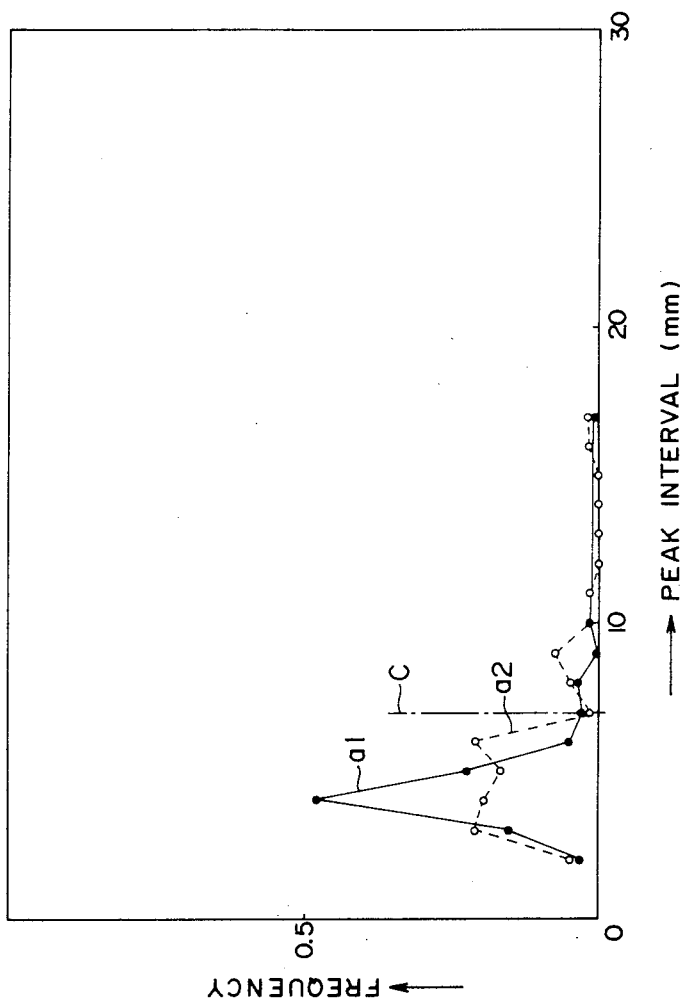

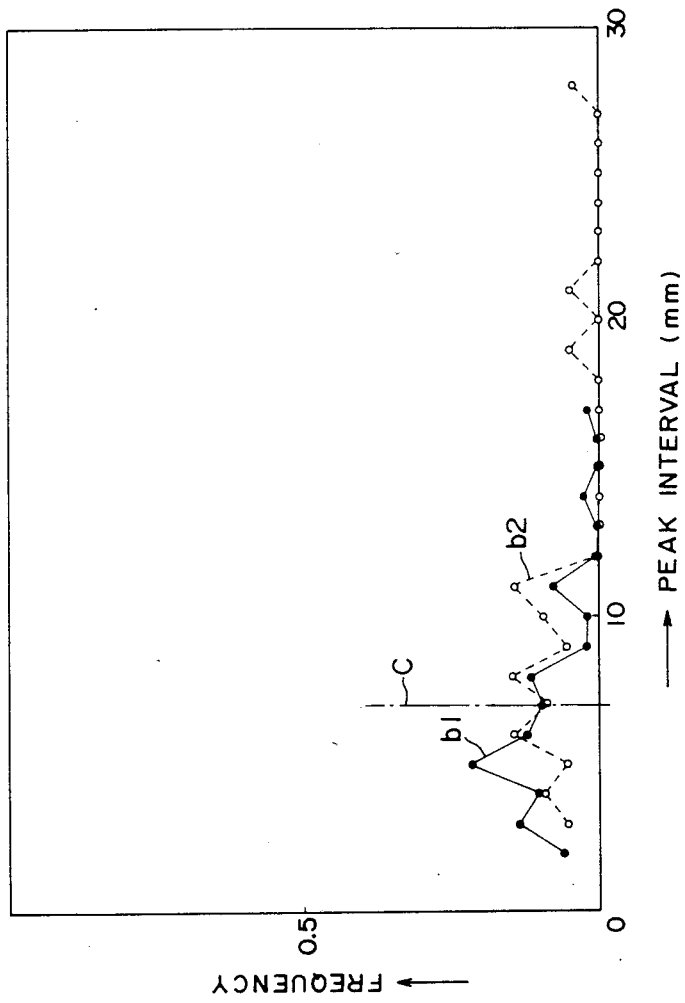

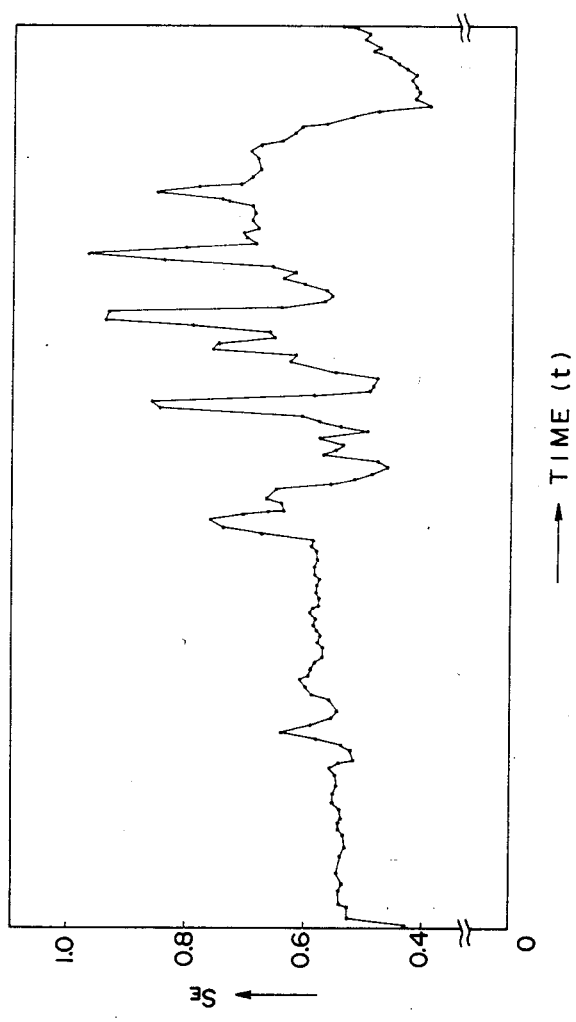

PICTURE IMAGE DISCRIMINATING APPARATUS

BACKGROUND OF THE INVENTION

1. Field of the Invention

This invention relates to a picture image discriminating apparatus for discriminating a picture image of document beforehand whether it is a linear picture with a line working as a principal constituent or a tonal picture consisting of a continuous tone so as to obtain a satisfactory reproduction on a reproducing apparatus. More particularly, it relates to a picture image discriminating apparatus for discriminating a picture image of document according to an electrical picture signal which is obtained from a light signal corresponding to the picture image through scanning the document.

2. Description of the Prior Art

An improvement in reproducing technique has effected of late a reproduction meeting a picture quality of the document consisting only of a linear picture or a tonal picture. To say concretely, the linear picture or the tonal picture is discriminated visually, there is prepared an independent operating button to specify reproducing conditions for the linear picture or the tonal picture, and thus an operator will select the suitable operating button according to a result obtained through visual observation, thereby obtaining a reproduction. Therefore, an erroneous decision or operation may lead to a wasteful reproduction.

In the existing circumstances wherein a high-speed and efficient operation is required for reproduction, and a copying machine provided with an automatic document feeder (ADF) has come rapidly into wide use therefor, an operation for picture image discrimination which depends, as mentioned, on visual observation is not to cope with the object of high-speed and efficient operation and is practically impossible for application on the copying machine provided particularly with ADF.

On the other hand, in case a picture image data is compressed to transmission or store like facsimile or picture image data base, an information compression efficiency is not secured satisfactorily unless coding process is applied to each linear picture and tonal picture, thus requiring a picture image discriminating apparatus.

As one of picture image discriminating methods, there prevails hitherto a method (U.S. patent application Ser. No. 292,012 filed Aug. 11, 1981, now abandoned) which comprises scanning a document, forming a histogram according to a density distribution at each point of the document, and thus deciding a picture image from a pattern of the histogram, however, while it is effective chiefly to a linear picture information, an application to a tonal picture is difficult. Moreover, a process for discrimination is complicated.

Then, a method to use the histogram described hereinabove requires a central processing unit like microprocessor for arithmetic operation of a data statistics, conversion, etc. and decision and a memory such as ROM and RAM essential for operation of the above unit, thus involving high cost and complicatedness.

SUMMARY OF THE INVENTION

In view of the requirements for high-speed operation, better efficiency and higher picture quality on the reproducing apparatus including a copying machine, an object of this invention is to provide a picture image discriminating apparatus capable of discriminating picture images of linear picture, tonal picture and hybrid picture definitely and using a simple circuit therefor.

The above object of the invention can be attained by a picture image discriminating apparatus operating for picture image discrimination through scanning a document and transmitting a picture signal obtained through converting a light signal photoelectrically at every unit reading sizes, which discriminates picture images particularly by a peak interval of a time series output of the picture signal, and further the discrimination can be simplified by specifying the unit reading size at 0.01 $mm^2$ or over in area.

In summarizing the invention, a light signal obtained through scanning a document is subjected to a photoelectric conversion. The light signal changes according to a picture image density distribution of the document, therefore the output converted photoelectrically also gives a peak time series diagram having a maximum value density (peak) detected number according to the picture image density distribution or the picture image and a peak interval. Therefore, a numerical value corresponding to the picture image is extracted from a dimension of the peak interval and number of times detected (frequency), and the picture image can thus be discriminated according to the numerical value.

The above object of this invention can be attained by a picture image discriminating apparatus for discriminating picture images through forming a picture signal corresponding to a light signal obtainable through scanning a document and processing the picture signal, which is provided with a differentiating circuit to differentiate a time series output of the picture signal obtained according the light signal and a binary-coding circuit to output a binary-coded pulse signal upon comparing an output signal of the differentiating circuit and a counter to count an output pulse from the binary-coding circuit, and discriminating picture images according to a signal output from the counter.

Other objects and features of this invention will be clarified along with the following description of the drawings.

BRIEF DESCRIPTION OF THE DRAWINGS

FIGS. 4(a) and 4(b) represent examples of a peak interval frequency graph;

FIGS. 10(a) and 10(b) represent one example of an SE curve obtained through putting the invention into practice.

DESCRIPTION OF THE PREFERRED EMBODIMENTS

Figure 1:
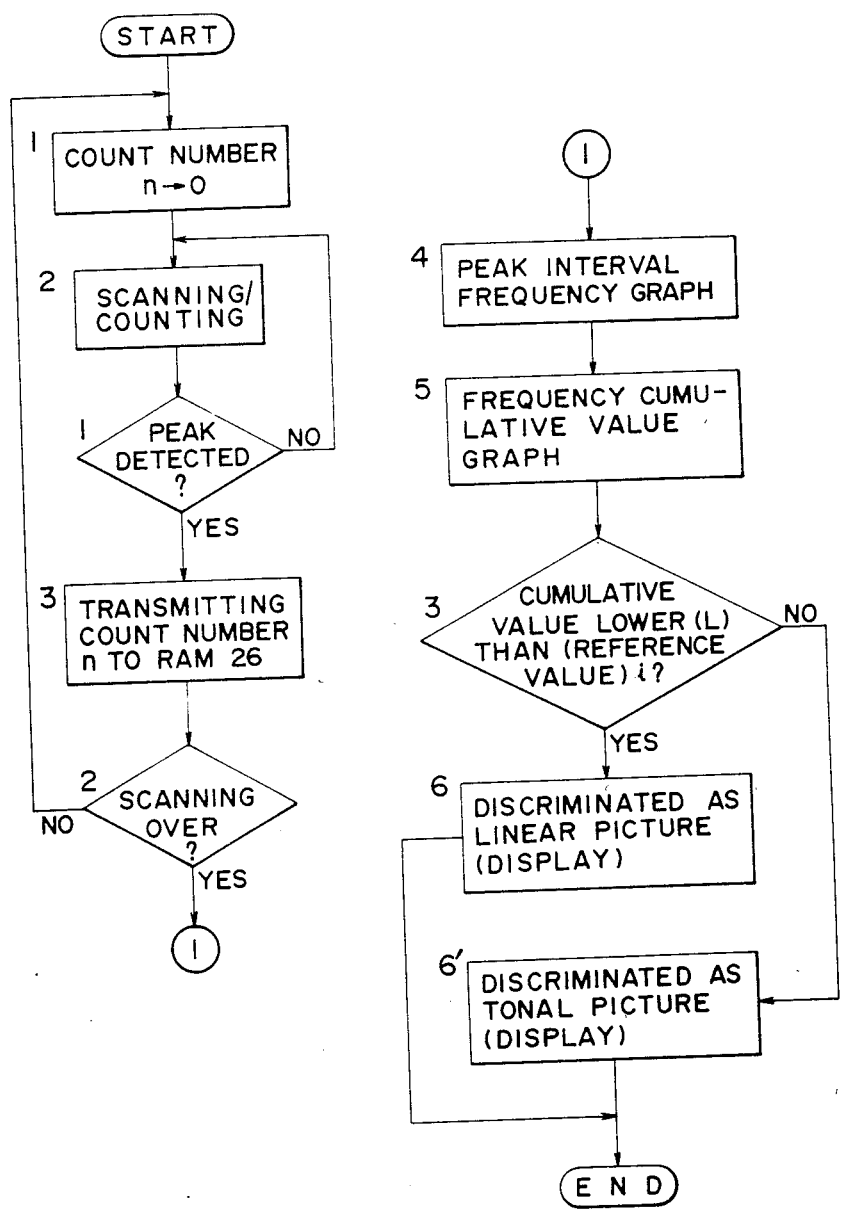
FIG. 1 is a flowchart of the process covering a document scanning to picture image discrimination according to this invention.
Figure 2:
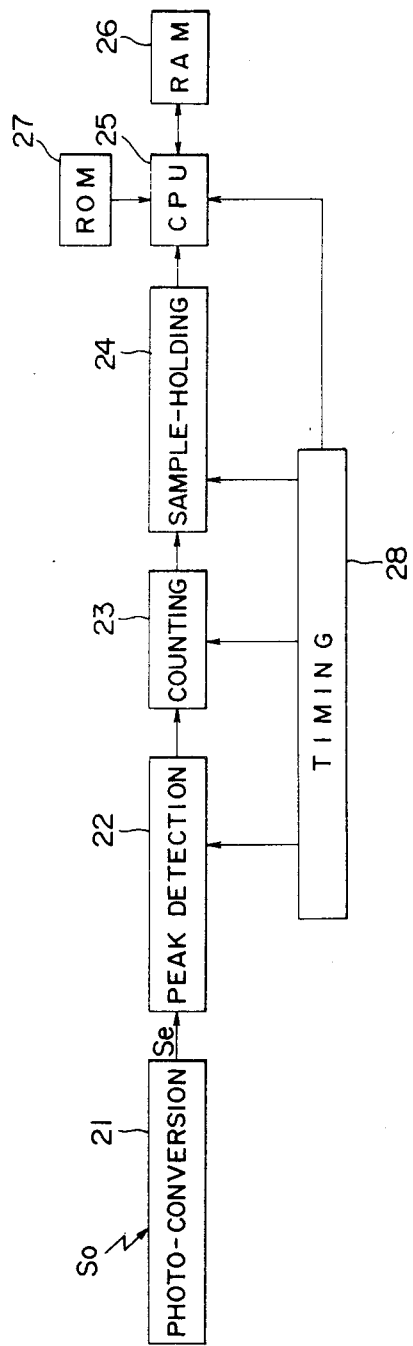
FIG. 2 is a block diagram of one operative example of the invention.
Figure 3:
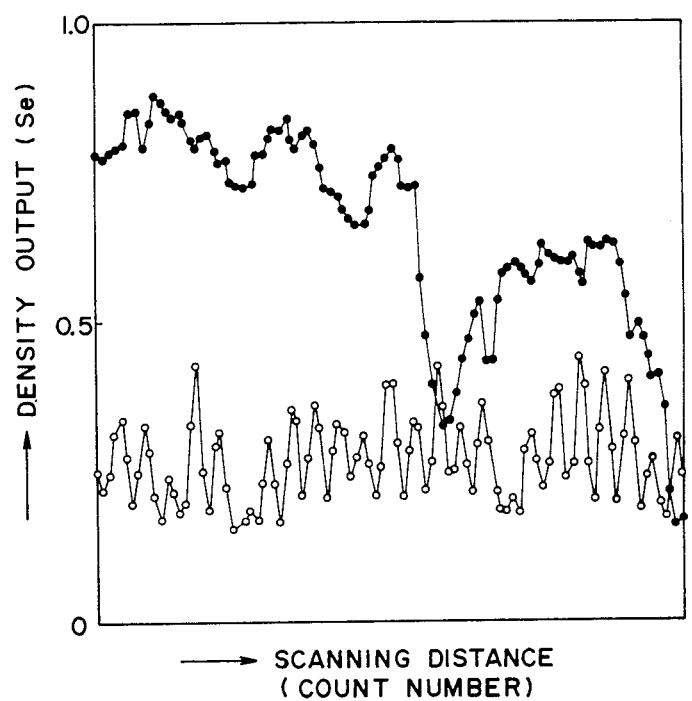
FIG. 3 is a peak time series diagram of a picture signal Se.

The invention will now be described concretely. FIG. 1 is a flowchart of a process up to picture image discrimination according to this invention. Then, FIG. 2 is a block diagram of a functional member which is a constituent of a signal processing division given in one embodiment of this invention. Further, FIG. 3 is a time series output (peak time series diagram) of a picture signal obtained midway of the process shown in the above flowchart on a picture image discriminating apparatus of this invention. The axis of ordinates indicates a dimension of the output of an electrical picture signal (denoted as Se) for which a light signal (denoted as So) according to picture image density of a document is received on a photoelectric conversion element or the like and then converted photoelectrically, and a high density direction is given upward correspondingly to density. The abscissa axis is that of plotting the time when the document is scanned, which can be made to correspond to a scanning distance (length), as a clock pulse number and further a scanning speed are already known to have been so specified on design. In the drawing, polygonal lines with black circles linked together thereon represent an example of a picture signal output obtained through scanning the photo part of a newspaper, and those with white circles linked together represent an example obtained from the character part of a newspaper. It is apparent that the peak interval varies clearly between the photo part and the character part.

In FIG. 2, 21 denotes a photoelectric conversion division including a photoelectric conversion element, where the light signal So reflected from a document is converted into the picture signal Se photoelectrically. Then, 22 denotes a peak detection circuit to detect the peak (maximum value having a projection toward high density side) of a time series output of the picture signal, and 28 denotes a timing control division to send a clock pulse with which to determine an operation timing of other functional members shown in the block diagram. A reference numeral 23 denotes a counting division to determine the peak interval by counting the clock pulse number, 24 denotes an S/H circuit for sample-holding of the clock pulse number, 25 denotes a central processing unit (CPU) including a microprocessor for arithmetic operation of a data statistics, conversion, etc. and decision, 26 denotes a memory (RAM) for recording and storing a data from CPU 25 and further for supplying the recorded data to CPU 25 again, and 27 denotes a memory (ROM) for storing arithmetic operation of CPU 25 and other programs.

Next, the process will be described with reference to the flowchart of FIG. 1.

Upon start of a scanning, a count number n of the clock pulse indicating a peak interval in the peak time series diagram is reset to 0, and scanning and counting go forward in parallel until the peak is detected (Processings 1, 2 and Decision 1). When the peak is detected, the count number (corresponding to scanning distance) is recorded in the memory RAM 26 as the number of peaks (Decision 1 and Processing 3), the count number n is again reset to 0, and Processings 1, 2, 3 and Decisions 1, 2 are repeated until the peak is detected again. When the scanning ends (Decision 2), the count number and number of peaks corresponding to the distance between peak detected positions stored in the memory RAM 26 are made into a frequency graph (called "histogram" hereinafter) of a peak interval value at CPU 25 along a program stored in the memory ROM 27 (Processing 4).

An example of the peak interval histogram is given in FIGS. 4(a) and 4(b). In the drawings, the frequency on the axis of ordinates indicates a numerical value when the number of peak detected times is normalized at 1.0, and the abscissa axis indicates a peak interval in mm.

FIG. 4(a) is the histogram obtained at a newspaper character part (polygonal line a1) and a linear picture test chart (polygonal line a2) as an example of the linear picture, and FIG. 4(b) is the histogram obtained at a newspaper photo part (polygonal line b1) and a catalog photo (polygonal line b2) as an example of the tonal picture. For scanning conditions, the light signal So is read at every scanning distance 1 mm with a 2 mm diametral unit reading size (spot).

As will be apparent from comparing FIG. 4(a) with FIG. 4(b), FIG. 4(a) obtained through scanning the linear picture has an abrupt peak in a domain with small peak interval, but FIG. 4(b) is relatively flat.

From preparing many a peak interval histogram as mentioned for linear picture and tonal picture, a peak interval threshold C can be determined in the peak interval histograms as a discrimination transition point of the linear picture and tonal picture. In FIGS. 4(a) and 4(b), a value 7 mm is employed for the peak interval threshold.

Figure 5:
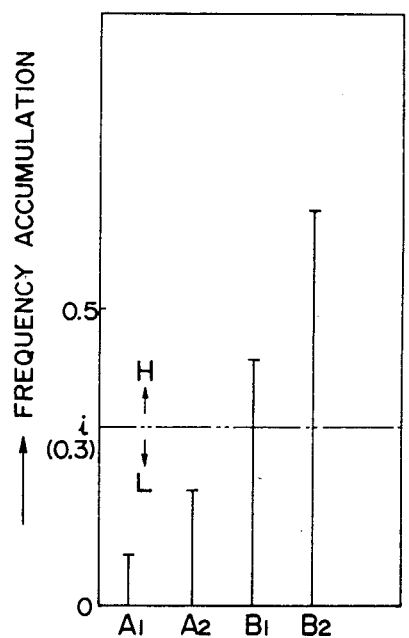
FIG. 5 is a frequency cumulative value histogram in a domain greater than a peak threshold C.

Then, with reference to the peak interval threshold, the peak interval histogram is distributed into two, frequencies are accumulated in either large or small domain to prepare a graph of the cumulative value, and from comparing the heights (accumulation frequencies) at each document or each block in the document, the linear picture and the tonal picture can be discriminated clearly from each other (Processing 5). FIG. 5 shows a frequency accumulation graph in the domain greater than the peak interval threshold C. Histograms A1, A2 and B1, B2 are obtained from polygonal lines a1, a2 and b1, b2 of FIGS. 4(a) and 4(b), respectively.

In the graph of FIG. 5, the height of cumulative value of the linear picture and the height of cumulative value of the tonal picture belong to a separate numerical aggregation, therefore a reference value (picture image discrimination reference value) i for expressing the linear picture and the tonal picture through binary-coding is prepared, and thus the picture image scanned with reference to the reference value i can be discriminated by referring to whether the cumulative value is high (H) or low (L), or a binary signal according thereto can be obtained (Decision 3). In FIG. 5, a value 0.3 is employed for the reference value i.

It is then preferable that an area of the unit reading size to a picture image of document regarding the invention will be given at 0.01 mm$^2$ or over, preferably, 1 mm$^2$–10 mm$^2$ so as to suppress an isolated pulse in the light signal So, and to moderate a fine change in color tone and density in the tonal picture, thereby increasing a difference between linear picture and tonal picture.

As described above, picture images can be discriminated easily by means of a simple circuit from embodying this invention.

Figure 6:
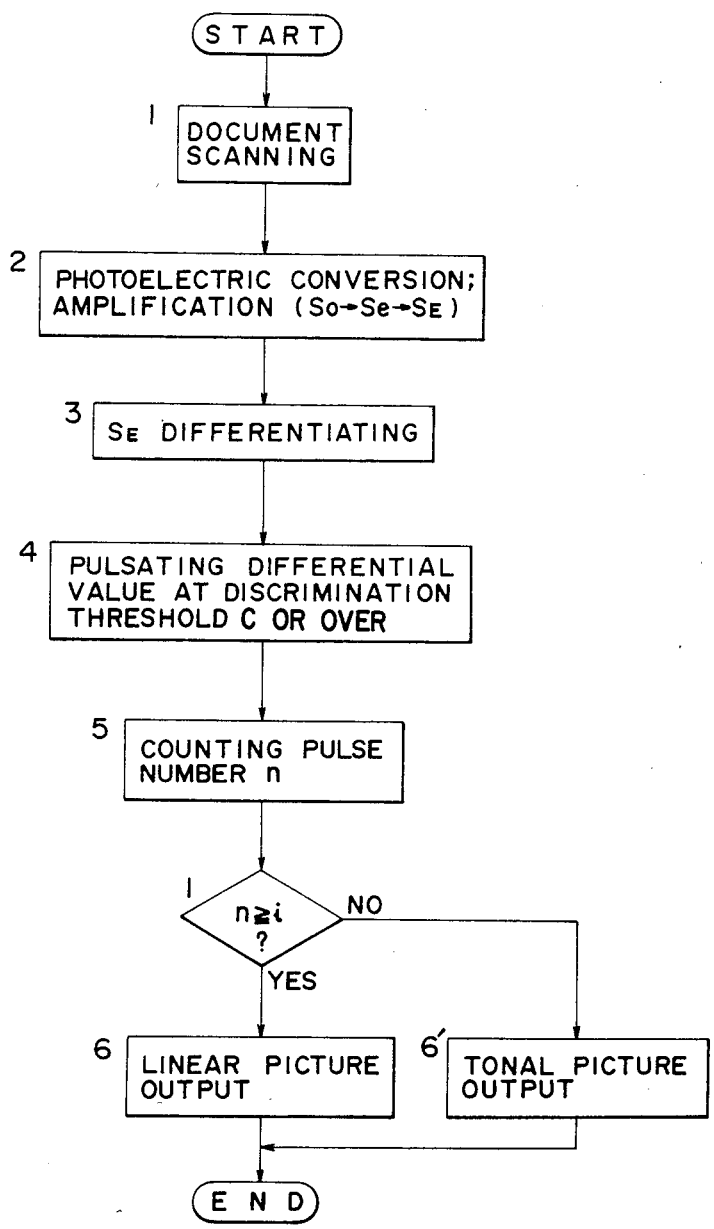
FIG. 6 is a flowchart indicating another process for picture image discrimination according to this invention.

In another operative example of this invention, a document is scanned according to Processing 1 of a flowchart of FIG. 6, and the electrical picture signal Se is obtained in time series according to the light signal So through a photoelectric conversion element of, for example, CCD or the like of the photoelectric conversion division. Further, it is amplified to a picture signal SE through an amplifier circuit, as occasion demands (Processing 2).

Figure 7A:
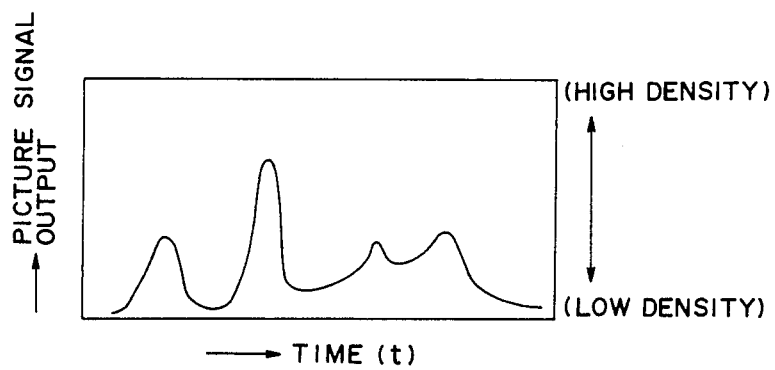
FIGS. 7(a) to 7(c) are drawings to describe a principle of picture image discrimination.

The picture signal SE obtained at every picture elements of CCD or on a discrete optical sensor gives an SE curve illustrated in FIG. 7(a) as a time series curve regarding a scanning time t. Shape and height of the SE curve vary according to a kind of the picture image of document and a reply efficiency of the photoelectric conversion element, and generally it has a signal portion consisting of a multitude of abrupt projections in a low density SE domain in the case of linear picture, however, in the case of tonal picture, it is given in an SE curve having a gentle projection in a higher density SE domain than the linear picture and allowing a minority of abrupt projections to lie scattered. Therefore, a picture image density factor present in the SE value can be erased and contracted to a picture image factor for a projecting signal by differentiating the SE curve (Processing 3). A result obtained through differentiating the SE curve in FIG. 7(a) by means of a differentiating circuit is shown in FIG. 7(b) as an SE differential curve.

In regard to the number of projections of the SE differential curve, they are distributed around average number values isolated each other for linear picture and tonal picture, therefore a constant threshold i can be determined as a reference (discrimination threshold) for discriminating picture images by the number of projections in the SE differential curve in linear picture and tonal picture.

Figure 7B:
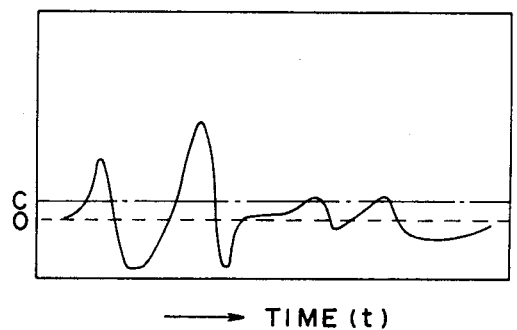

Therefore, the SE differential curve is pulsated according to a threshold C for example which is shown in FIG. 7(b) (Processing 4), the pulse number is counted, the count value is given at n (Processing 5), and from comparing the n with the above-mentioned threshold i for magnitude (Decision 1), picture images can be discriminated (Processings 6 and 6').

Figure 7C:
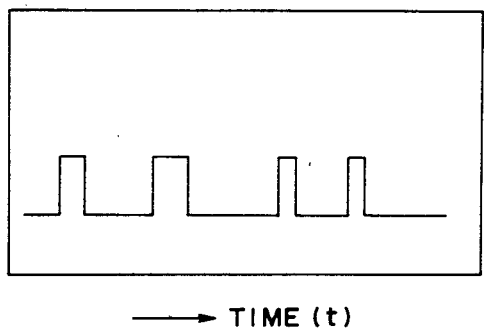

A result obtained through pulsating the SE differential curve on the threshold C is shown in FIG. 7(c).

An operative example of the picture image discriminating apparatus according to this invention will be described as follows.

Figure 8:
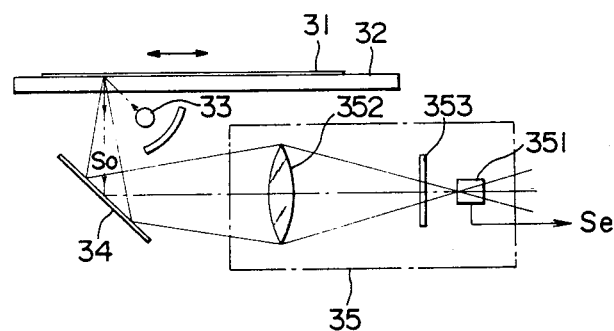
FIG. 8 is a schematic view of an operative example of this invention.

FIG. 8 represents the operative example of this invention.

In FIG. 8, 31 denotes a document, 32 denotes a document glass plate, which reciprocates in the direction indicated by an arrow. Then, 33 denotes a light source. The document can be irradiated by means of a laser beam or a light focused by a lens, or the light can be led to a photoelectric conversion division from the document illuminated uniformly by means of a slit or a glass fiber. In the illustrated example, the document is irradiated uniformly by a halogen lamp. Then, laser beam or tungsten filament lamp, xenon lamp, sodium vapor lamp, fluorescent lamp, LED, EL or iodine lamp can be used for the light source.

A reference numeral 34 denotes a mirror, 35 denotes a photoelectric conversion division, the light signal So which is a reflection corresponding to a picture image density from the document is bent for optical path by the mirror 34, comes into the photoelectric conversion division 35 and is then converted as an electrical picture signal Se.

The photoelectric conversion division 35 of the illustrated operative example is provided with a condensing lens 352 to focus a light of the light signal So, a filter 353 arranged, as occasion demands, for adjusting a wavelength spectrum of the focused light, and a photoelectric conversion element 351 to convert the light signal So photoelectrically into the picture signal Se. The photoelectric conversion element 351 is not necessarily to be installed on a focal plane of the condensing lens 352 and hence is positioned anywhere subject to being in a focused luminous flux. Even in an approximate focus domain, there may be a case where the picture image discrimination can be effected more advantageously. The filter 353 can be installed either before or after the condensing lens 352, and not only a color filter but also a prism or a grating which separates a wavelength by refraction can be used. Furthermore, an infrared-ray cut filter can also be used.

Figure 9:
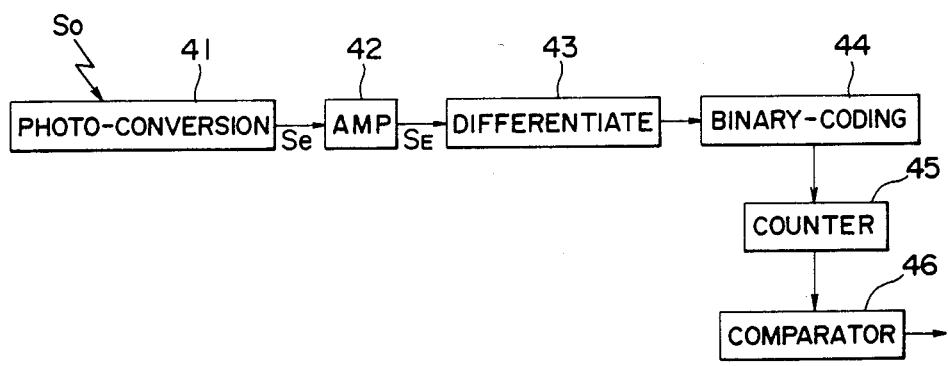
FIG. 9 is a block diagram of a signal processing division of the operative example of this invention.

The picture signal Se obtained from the photoelectric conversion division 35 is processed uninterruptedly to a picture image discrimination by the signal processing division as described in the above-mentioned flowchart. FIG. 9 represents an example of a block diagram of the signal processing division.

In FIG. 9, 41 denotes a photoelectric conversion division, which receives the light signal So and converts it as picture signal Se. A reference numeral 42 denotes an amplifier circuit, which amplifies the signal Se and outputs an amplified picture signal SE. Then, 43 denotes a differentiating circuit. A differential value is obtained from the SE curve obtained through the amplifier circuit 42. A reference numeral 44 denotes a binary-coding circuit, which generates a binary pulse according to a binary threshold C; 45 denotes a pulse number counter; 46 denotes a comparator, which compares the discrimination threshold i with a pulse number n obtained on the counter 45 and generates a picture image discriminated result for display or as a control factor of reproducing conditions.

An example in which picture images are discriminated on the picture image discriminating apparatus according to this invention is given below.

Figure 10A:
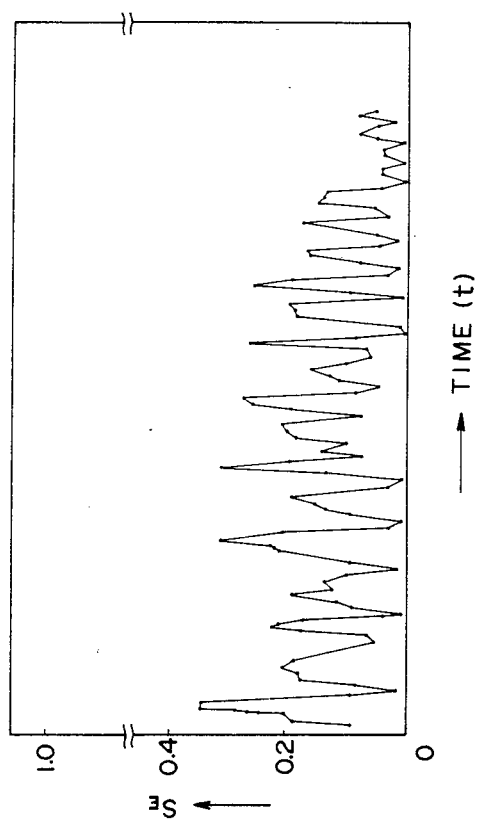

FIG. 10(a) represents SE curve obtained through scanning Test Chart No. 2 specified by Picture Image Electronics Society or a character line with many strokes character in a 2 mm diametral until reading size (sample domain), the SE curve is differentiated and then the differential waveform is processed with the binary threshold C to obtain 21 as the pulse number n. Then, FIG. 10(b) represents an example of the SE curve obtained similarly from a landscape, and 9 is obtained as the pulse number n through a similar processing. Therefore, an output to discriminate picture images is obtainable, if the discrimination threshold i is set at 15 or around.

Further, an adjacent small maximum value to give a noise in discrimination can be erased in a picture image exceedingly sharp in density change in the SE curve by selecting an area of the unit reading size, thereby securing the picture image discrimination furthermore.

What is claimed is:

1. In a picture image discriminating apparatus which operates for forming a picture signal corresponding to a light signal obtained through scanning a document and processing said picture signal for picture image discrimination, the improvement characterized in that it comprises a differentiating circuit to differentiate a time series output of the picture signal obtainable according to said light signal, a binary-coding circuit to compare an output signal from the differentiating circuit with a specific level and output a binary pulse signal, a counter to count an output pulse from the binary-coding circuit, means for comparing a pulse number counted by the counter with a predetermined value, and picture images are discriminated according to an output from the counter.

2. In a picture image discriminating apparatus having a scanning unit for scanning a picture image, means for obtaining a picture signal through converting a light signal from the scanning unit photoelectrically at every unit reading size, a signal processing division for discriminating a picture image by dealing with said picture signal, the improvement characterized in that said signal processing division comprises means for detecting a peak of time series output of said picture signal, means for obtaining the peak interval by comparing the signal from the detecting means with a reference signal and providing binary pulse output signals, and means for discriminating the picture image by counting the number of times the output signals are detected in each interval.

3. The picture image discriminating apparatus as defined in claim 24, wherein an area of the unit reading size on the document surface is 0.01 mm$^2$ or over.

4. A method of discriminating picture images comprising the steps of obtaining picture image signals by scanning a document and by photoelectrically converting picture images so obtained, detecting peaks of the picture image signals by comparing them with a reference signal and providing binary pulse output signals based on the comparison, counting the output signals and providing counting signals, obtaining peak intervals, and discriminating the picture images by employing the counting signals for obtaining frequency distribution at every peak interval.

5. The method of discriminating as defined in claim 4, wherein the picture images are discriminated at every picture element.

6. The method of discriminating as defined in claim 5, wherein each picture element area is 0.01 square mm or over.

* * * * *